(12) United States Patent
Hashimoto

(10) Patent No.: US 10,661,703 B2
(45) Date of Patent: May 26, 2020

(54) MOTORCYCLE LIGHT SYSTEM AND METHOD OF USE

(71) Applicant: Peymon Hashimoto, Arlington, TX (US)

(72) Inventor: Peymon Hashimoto, Arlington, TX (US)

(73) Assignee: ALLIGHT CORP, West Hollywood, CA (US)

( * ) Notice: Subject to any disclaimer, the term of this patent is extended or adjusted under 35 U.S.C. 154(b) by 0 days.

(21) Appl. No.: 16/179,407

(22) Filed: Nov. 2, 2018

(65) Prior Publication Data

US 2019/0283662 A1 Sep. 19, 2019

Related U.S. Application Data

(60) Provisional application No. 62/643,354, filed on Mar. 15, 2018.

(51) Int. Cl.
| | | |
|---|---|---|
| *B60Q 1/124* | (2006.01) | |
| *B62J 6/02* | (2020.01) | |
| *F21V 21/30* | (2006.01) | |
| *B60Q 1/12* | (2006.01) | |
| *B60Q 1/08* | (2006.01) | |
| *F21S 41/657* | (2018.01) | |
| *F21W 107/17* | (2018.01) | |

(52) U.S. Cl.
CPC ............. *B60Q 1/124* (2013.01); *B60Q 1/122* (2013.01); *B62J 6/02* (2013.01); *F21V 21/30* (2013.01); *B60Q 1/085* (2013.01); *B60Q 2300/122* (2013.01); *B60Q 2300/13* (2013.01); *B60Q 2300/136* (2013.01); *B60Q 2900/10* (2013.01); *F21S 41/657* (2018.01); *F21W 2107/17* (2018.01)

(58) Field of Classification Search
CPC ............ B60Q 1/124; F21V 21/30; B62J 6/02
See application file for complete search history.

(56) References Cited

U.S. PATENT DOCUMENTS

| | | | | |
|---|---|---|---|---|
| 2005/0270785 A1* | 12/2005 | Gropp | ............... | B60Q 1/12 362/475 |
| 2010/0168966 A1* | 7/2010 | Tsujii | ............... | B60Q 1/12 701/48 |

* cited by examiner

*Primary Examiner* — Joseph L Williams
(74) *Attorney, Agent, or Firm* — Patent Grove LLC; Tomas Friend

(57) ABSTRACT

A motorcycle light includes a lighting device, having a headlight contained within a housing; a rod configured to engage with a headlight connection of a motorcycle; and one or more wires to engage with an electrical system of the motorcycle; a motor engaged with the housing and to provide rotational movement of the housing relative to the rod; and one or more sensors in electrical communication with the motor and to detect when the motorcycle is at a leaning position, the one or more sensors to provide a command to the motor to rotate the housing to a desired angle for improved visibility.

2 Claims, 6 Drawing Sheets

MOTORCYCLE LIGHT SYSTEM AND METHOD OF USE

BACKGROUND

1. Field of the Invention

The present invention relates generally to motorcycle and scooter lighting systems, and more specifically, to a motorcycle and scooter lighting system for providing a lighting device configured to rotate and adjust as needed in order to ensure that the rider's path is illuminated even while the motorcycle is in a tilted position, such as while turning.

2. Description of Related Art

Motorcycle lighting systems are well known in the art and are effective means to providing light during riding a motorcycle/scooter. For example, FIG. 1 depicts a conventional motorcycle 101 having a motorcycle body 103 with a light 105 secured thereon. During use, the user activates light 105 and proceeds to ride.

One of the problems commonly associated with motorcycle 101 is limited use. For example, as a rider turns and thereby tilts the bike, the light no longer lights the ideal path for the rider.

Accordingly, although great strides have been made in the area of motorcycle lighting systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
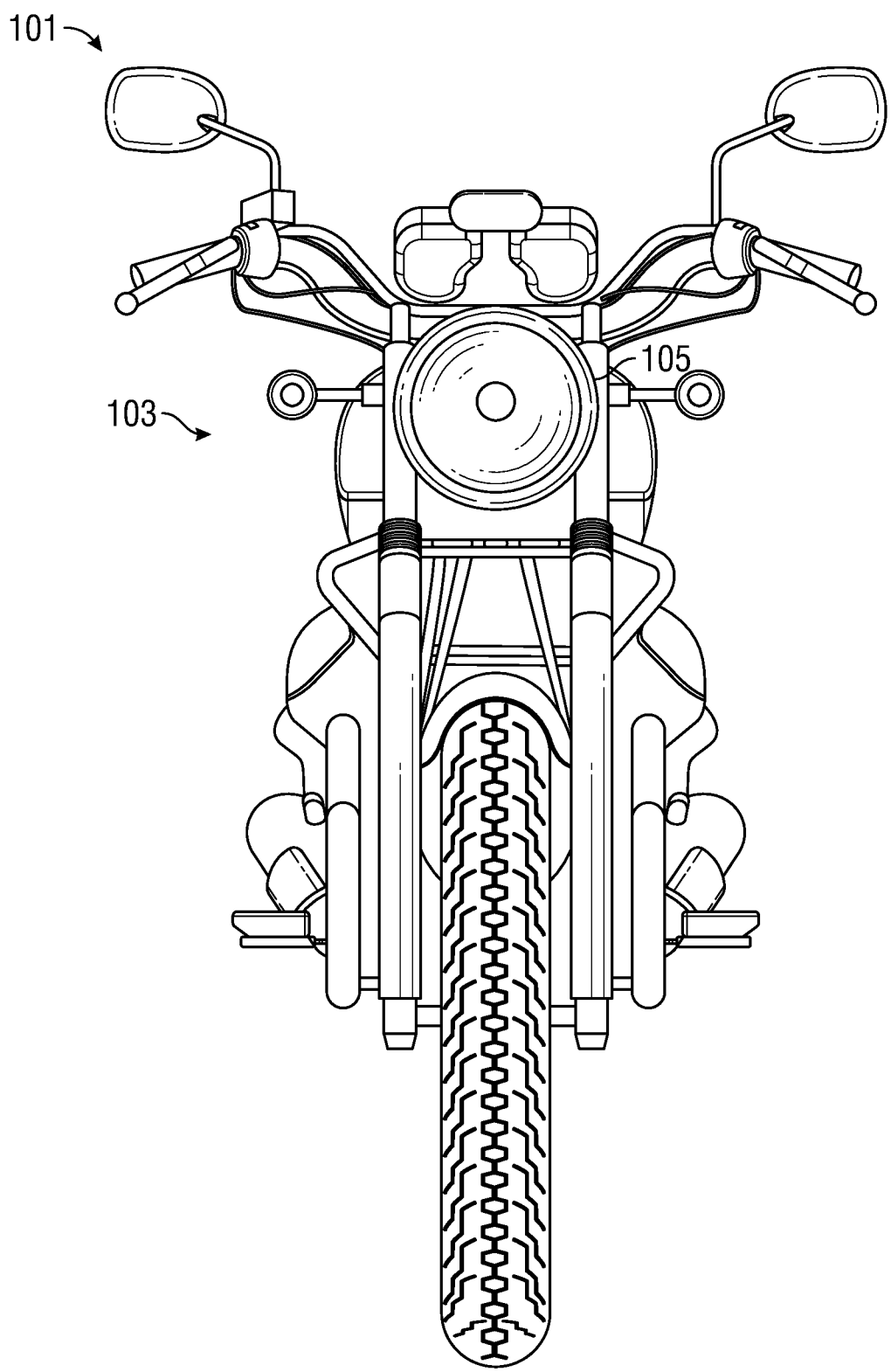
FIG. 1 is a front view of a conventional motorcycle lighting system.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional motorcycle lighting systems. Specifically, the present invention provides for a lighting system configured to rotate a light, and thereby position the illumination in a needed position for the rider. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2A:
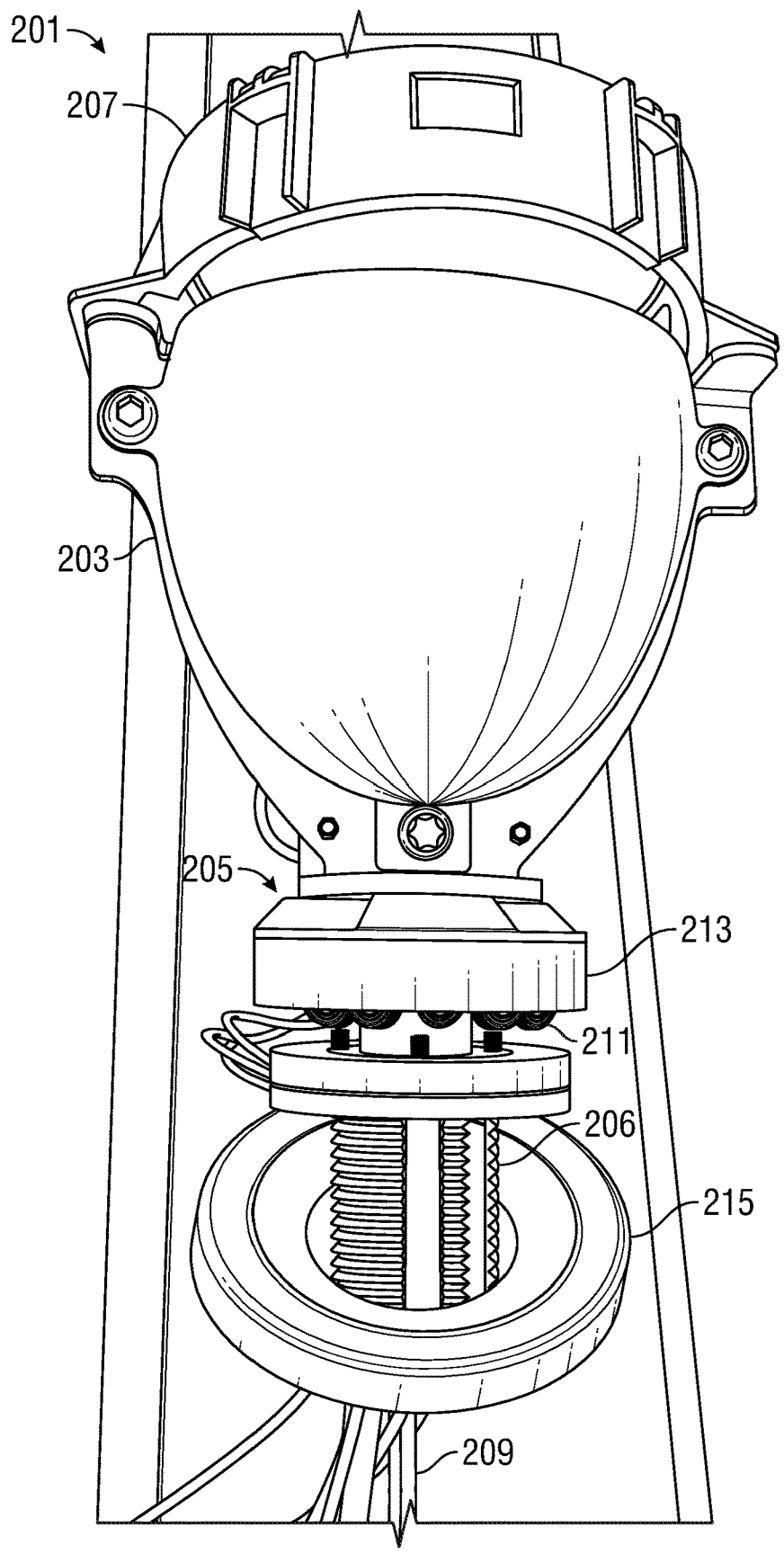
FIGS. 2A and 2B are side views of a motorcycle lighting system shown in two different rotational positions in accordance with a preferred embodiment of the present application.
Figure 2B:
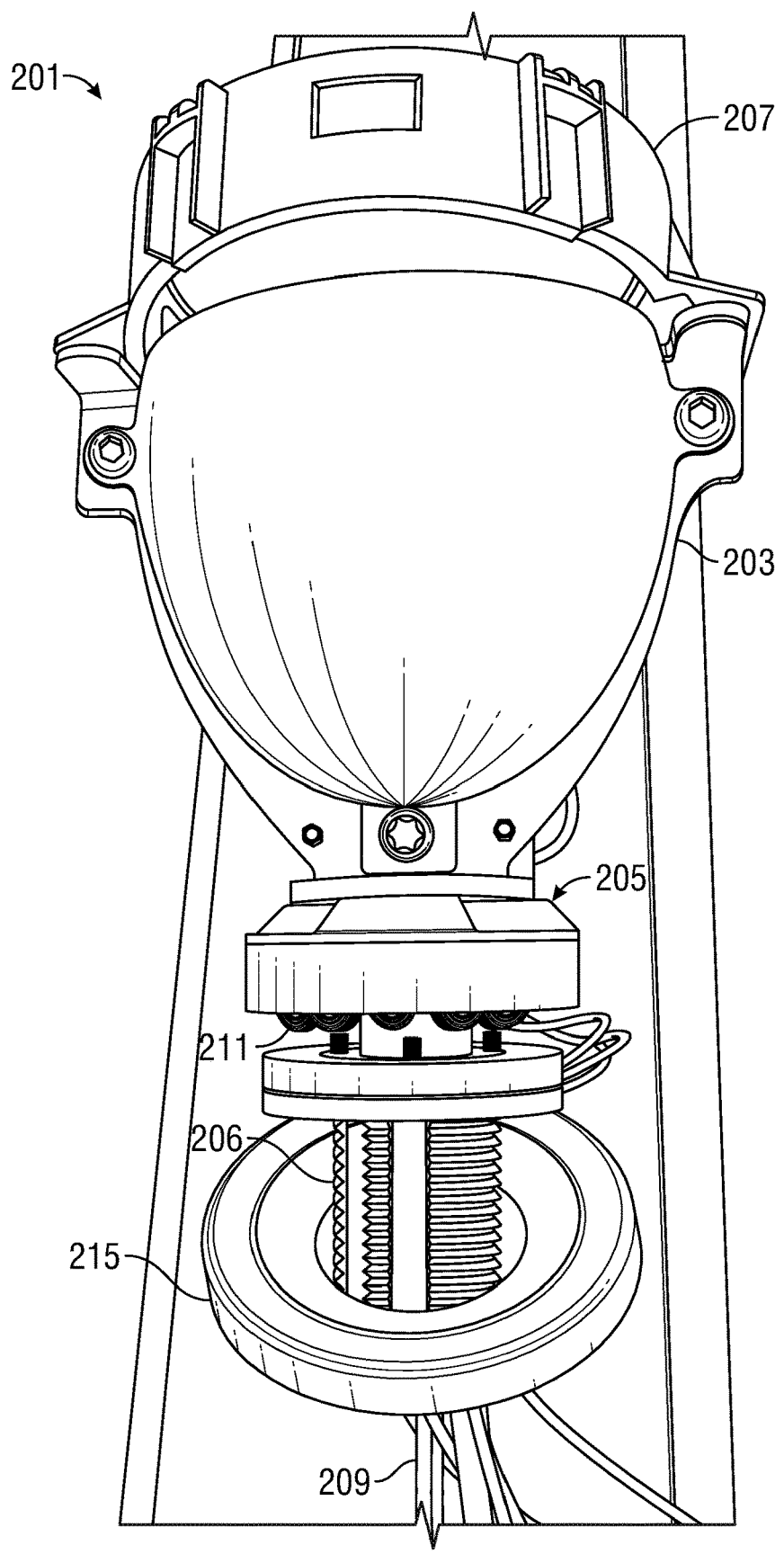

Referring now to the drawings wherein like reference characters identify corresponding or similar elements throughout the several views, FIGS. 2A and 2B depict side views of a motorcycle lighting system in accordance with a preferred embodiment of the present application. It will be appreciated that system 201 overcomes one or more of the above-listed problems commonly associated with conventional motorcycle lighting systems.

In the contemplated embodiment, system 201 includes a housing 203 to house a light 303, the housing 203 being in communication with a rod 206 configured to engage with a motorcycle or scooter headlight connection. It should be appreciated that the housing and rod can vary as desired and needed for use with a plurality of different motorcycles, scooters, and the like. A plurality of wires 209 provide a means for electrical connection to the motorcycle electrical system, thereby allowing for rider activation via the motorcycle.

System 201 further includes a motor 213 engaged with a base 205 of housing 203, wherein the motor 213 is configured to rotate relative to rod 206. It should be appreciated that FIG. 2A demonstrates a first rotational position, and FIG. 2B demonstrates a second rotational position. The motor is in electrical communication with a control system 401, wherein the motor rotates based on commands received, as will be discussed herein. As shown, the rod 206 engages within motor 213 via a rotating interior 211, as is known in the art.

In the preferred embodiment, a plurality of sensors are included within the motor, such as a gimbal motor, to allow for the rotation of the light based on position of the motorcycle. It is contemplated that other types and styles of motors and sensors could be used to achieve the same results.

It should be appreciated that one of the unique features believed characteristic of the present application is the user of a motor and/or sensors to allow for the light to adjust automatically based on the position of the motorcycle. For example, as the rider leans to turn, the light will remain in a desired position to light the needed path. This provides for a safer means for the user to ride at night.

Figure 3:
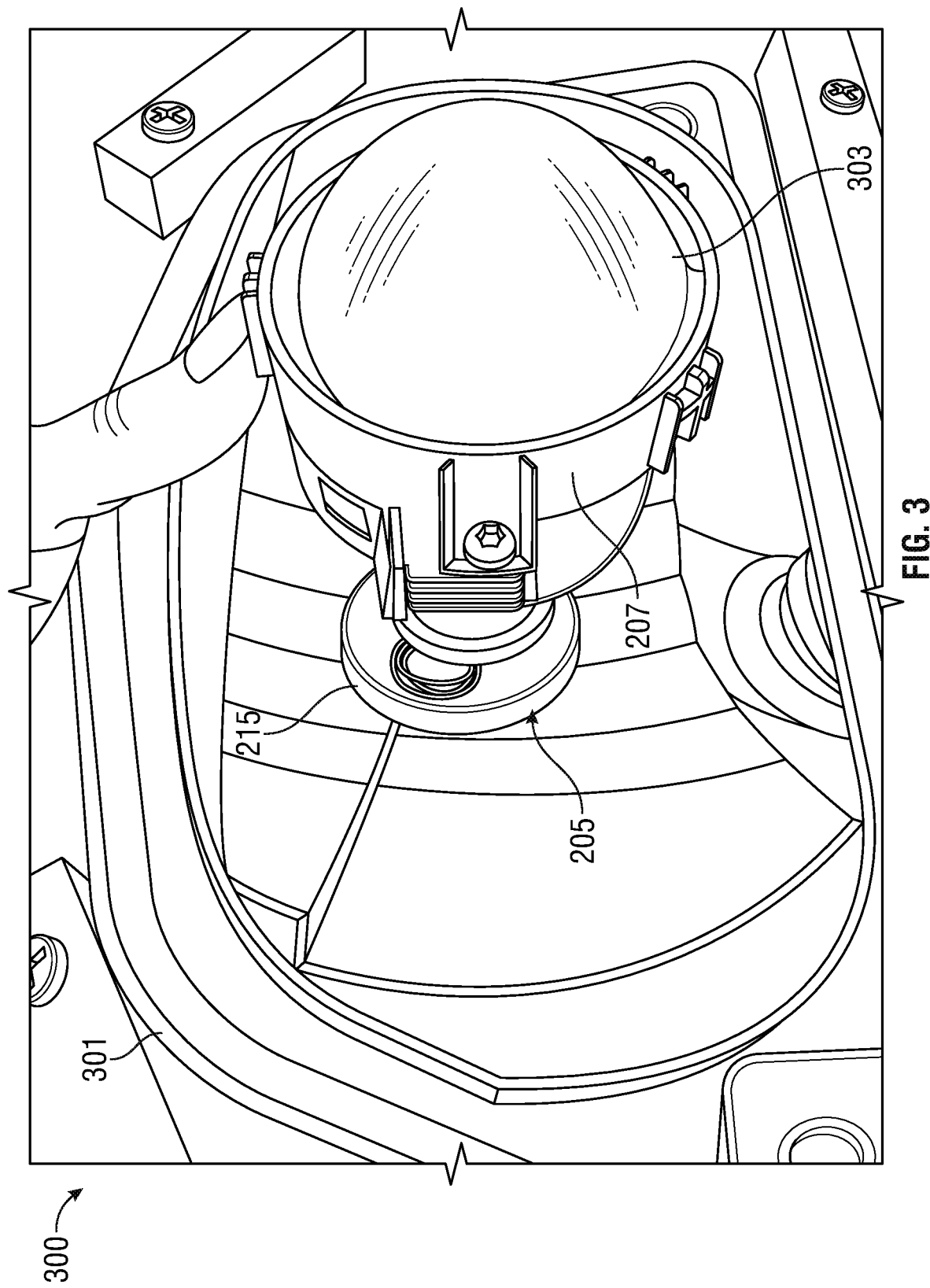
FIG. 3 is an oblique view of the motorcycle lighting system of FIGS. 2A and 2B installed.

In FIG. 3, an oblique view 300 depicts the light system 201 to engage with a housing 301. The light system 201 can be secured in place via plates 215 or any other conventional means known in the art.

Figure 4:
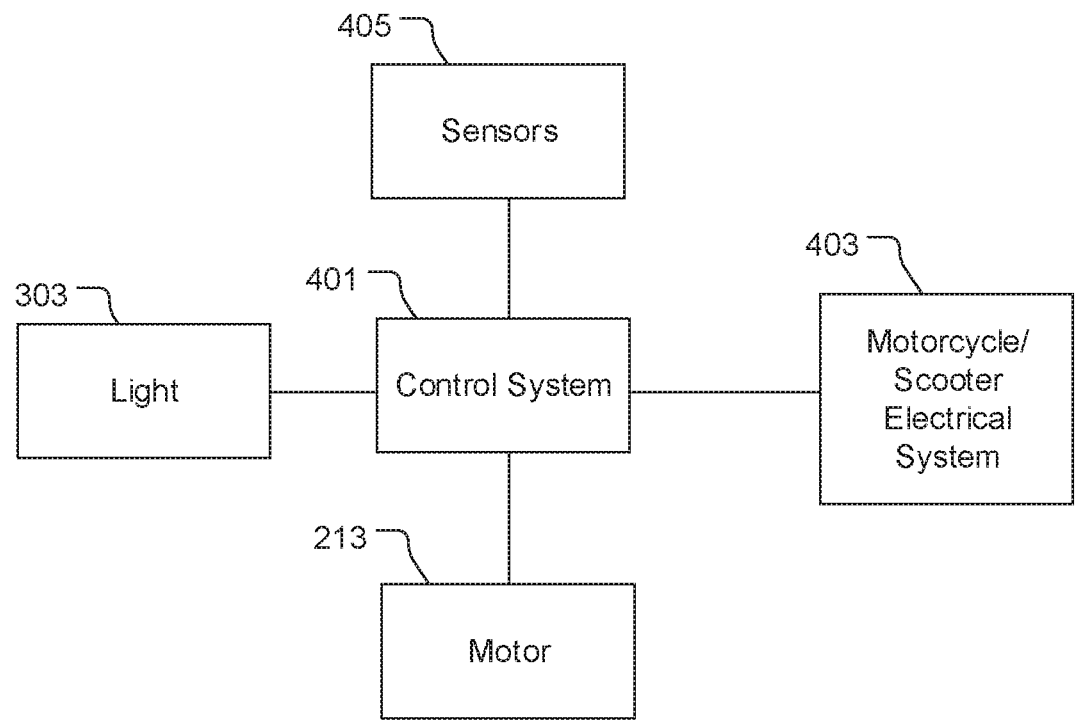
FIG. 4 is a simplified schematic of a control system and motor of FIGS. 2A and 2B.

In FIG. 4, a simplified schematic depicts control system 401, wherein the control system 401 communicates with the motorcycle/scooter electrical system 403, the motor 213, one or more sensors 405, and the light 303.

Figure 5:
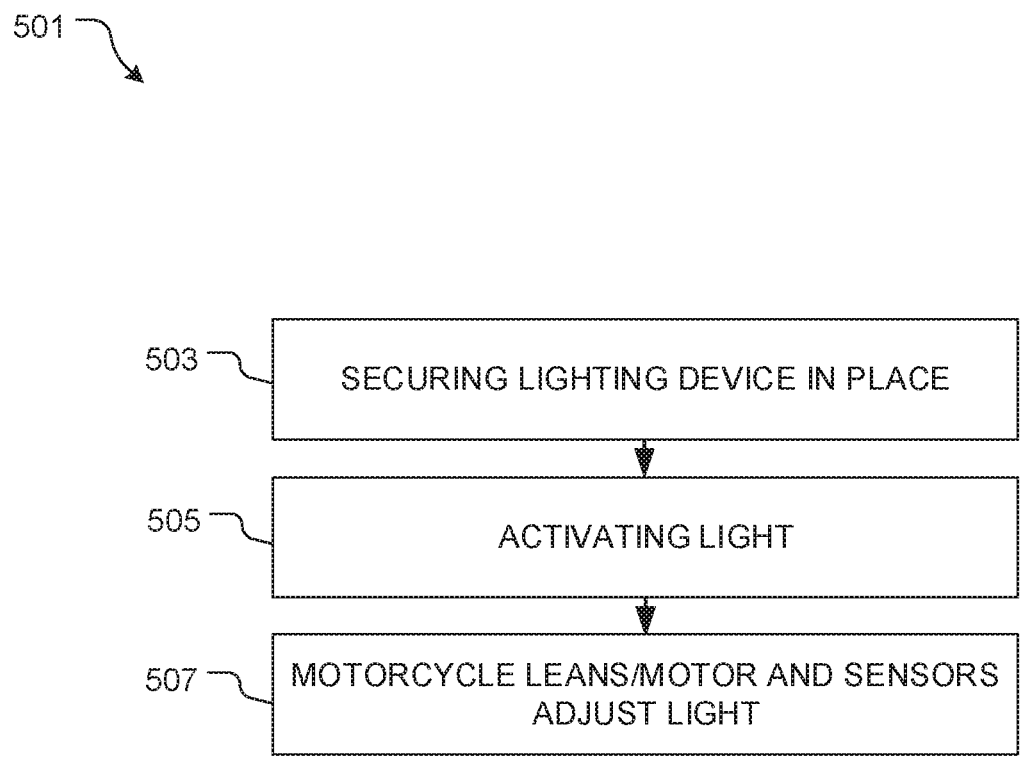
FIG. 5 is a flowchart of the method of use of the system of FIGS. 2A and 2B.

In FIG. 5, a flowchart 501 depicts a method of use of system 201. During use, the lighting system 201 is secured to the motorcycle, as shown with box 503. The light is activated and as the motorcycle/scooter is tilted, the motor/sensors/control system aid in maintaining the light illumination in a desired direction, as shown with boxes 505, 507.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A motorcycle light system, comprising:
   a lighting device, having:
   a headlight contained within a housing;
   a rod configured to engage with a headlight connection of a motorcycle; and
   one or more wires configured to engage with an electrical system of the motorcycle;
   a gimbal motor engaged with a base of the housing and the rod and configured to provide rotational movement of the housing relative to the rod around a rotational axis of the gimbal motor; and
   one or more sensors in electrical communication with the gimbal motor and configured to detect when the motorcycle is at a leaning position, the one or more sensors configured to provide a command to the gimbal motor to rotate the housing to a desired angle for improved visibility.

2. A method of motorcycle lighting, the method comprising:
   providing the system of claim 1;
   securing the lighting device to a headlight connection port of the motorcycle; and
   activating the lighting device via electrical elements of the motorcycle;
   wherein the one or more sensors and the motor cause the housing to rotate as needed.

\* \* \* \* \*